No. 757,199. PATENTED APR. 12, 1904.
M. A. KENNEDY.
VEHICLE TIRE.
APPLICATION FILED AUG. 24, 1900.
NO MODEL.
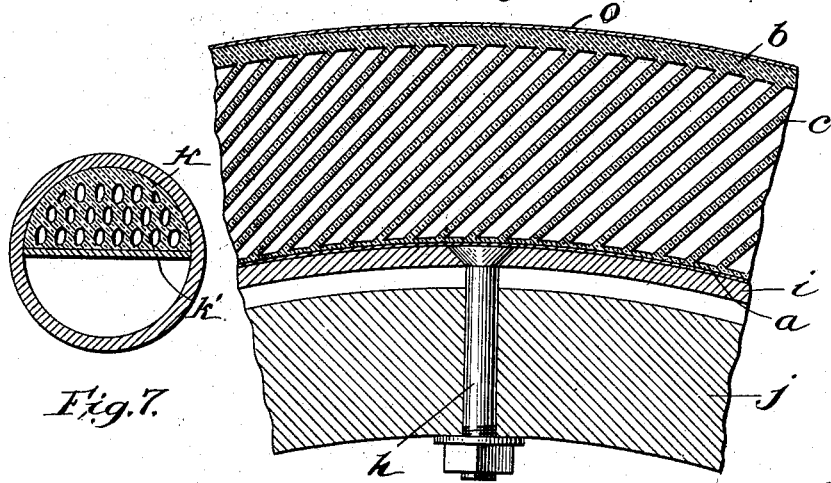
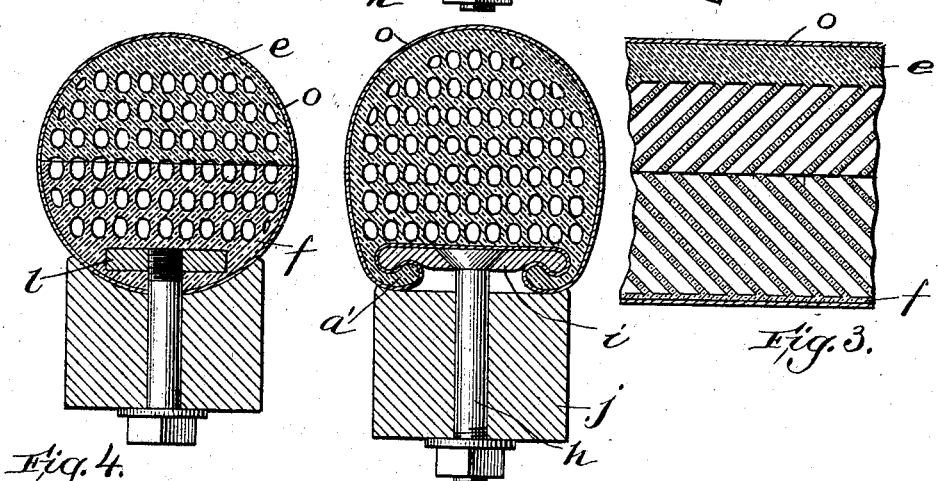
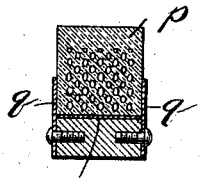
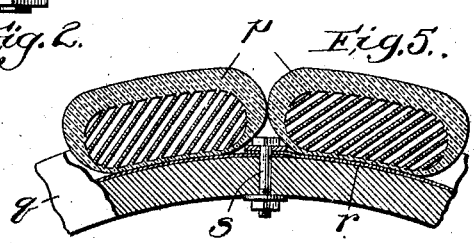
Witnesses
Arthur T. Randall
Charles F. Logan
Inventor:
M. A. Kennedy
by Geo. N. Goddard
Attorney.

No. 757,199.

Patented April 12, 1904.

UNITED STATES PATENT OFFICE.

MICHAEL A. KENNEDY, OF BOSTON, MASSACHUSETTS, ASSIGNOR TO TREDAIR RUBBER COMPANY, OF BOSTON, MASSACHUSETTS, A CORPORATION OF NEW JERSEY.

VEHICLE-TIRE.

SPECIFICATION forming part of Letters Patent No. 757,199, dated April 12, 1904.

Application filed August 24, 1900. Serial No. 27,927. (No model.)

*To all whom it may concern:*

Be it known that I, MICHAEL A. KENNEDY, a British subject, and a resident of Boston, county of Suffolk, Massachusetts, have invented certain new and useful Improvements in Vehicles-Tires, of which the following is a specification.

My invention relates to vehicle-tires, and is intended to provide an elastic and yielding tire in which the elastic properties of rubber may be so utilized as to secure as great a degree of yield in the tire as may be desired without sacrificing the durability or elasticity of the tire.

In tires of the pneumatic class as heretofore constructed while any desired degree of yield may be secured, yet their liability to puncture renders them in some degree objectionable. This objection is overcome in the solid tires or in tires of the cushion type; but in both these classes the yield of the tire depends upon the compressibility of the rubber and is limited thereby.

My present invention overcomes the objection inherent to pneumatic tires, while at the same time making it possible to secure any desired degree of yield, as the yield is dependent upon the stretch of rubber and not upon its compressibility.

To this end my invention comprises a tire molded and vulcanized so as to form numerous small orifices or chambers separated by elastic walls so disposed as to be stretched by the compression of the tire and which, therefore, utilizes the retractile properties of stretched rubber to restore the tire to its normal shape or condition when the pressure is removed. These orifices may be arranged in various ways without departing from the principle of my invention, although I usually prefer to arrange them so that they extend obliquely to the longitudinal axis of the tire.

In the accompanying drawings I have illustrated some of the forms in which the principles of my invention may be embodied.

Figure 1 is a central sectional view through a portion of the tire and the rim of the wheel to which the tire is attached. Fig. 2 is a vertical cross-section thereof. Fig. 3 is a longitudinal section of a modified form of tire. Fig. 4 is a vertical cross-sectional view of said modification. Fig. 5 is a longitudinal section of a form in which separate blocks of rubber are secured to the wheel-rim. Fig. 6 is a cross-sectional view thereof. Fig. 7 is a cross-sectional view of a pneumatic tire whose tread portion is filled with my new fabric.

In the practice of my invention the rubber is molded so as to form a great number of small tubular orifices or chambers, which, as in the form shown in Figs. 1 and 2, extend obliquely from the base or inside face *a* of the tire to the outside face or tread *b*. The web or wall of rubber *c* surrounding each orifice is left sufficiently thin to be quite elastic. The peripheral wall of the tire may be of any desired thickness, the thickness of this wall inclosing the orifices and of all the orifice-walls being determined by the degree of elasticity that it is desired to secure. The tread portion of the peripheral wall may be made thicker than the said base portion, if desired.

It will be perceived that if one were to press heavily upon this tire with the thumb that portion of the tire lying under the thumb would be depressed. This depression must inevitably be accompanied by the stretch or distention of the web in the immediate vicinity of the portion compressed. It will also be clear that upon the removal of the pressure the retractile force of the distended rubber walls will operate to cause the tire to resume its original or normal shape. The principle of operation therefore consists in utilizing the stretch or distensibility of rubber to secure the desired degree of compressibility in the tire instead of, as heretofore, utilizing the compressibility of the rubber itself, as in a solid tire, which is very much more limited than its distensibility. On the other hand, the return of the tire to its normal shape is due to the retractile force of the rubber. This principle is very important in practical use, inasmuch as any cellular arrangement which does not employ these inherent properties of the rubber will become speedily broken down, whereas the durability of a tire constructed according to my invention is limited only by the length of time for which the rubber retains its elasticity, and in the best grades of rubber these properties under such conditions as a tire are subjected to will last indefinitely.

In the practice of my invention it is quite possible and even advantageous to combine the pneumatic principle with the above-described principle, which characterizes the various forms of fabric which constitutes this invention. It will be understood, therefore, that in the manufacture of the various forms herein shown and described the orifices may be completely closed, so as to confine a body of air therein.

In Figs. 3 and 4 I have shown a form of tire in which the perforated rubber is made in substantially hemispherical sections $e$ and $f$, the flat faces of which may be vulcanized together, by which operation the air is hermetically confined within the orifices, the line of union between the two sections corresponding to the longitudinal axis of the tire. In this case each orifice is quite independent of the others.

In Fig. 7 I have shown the outer half or tread portion of the tire filled with a rubber strip of fabric $k$, constructed according to my invention, while the inner or base portion of the tire is left vacant in order to form an air-chamber. In this case I prefer to close the inner ends of the oblique orifices by a strip of solid vulcanized rubber, as indicated at $k'$. It will of course be understood that various modes besides those herein referred to of combining the two principles may be adopted.

The durability of the tire may be increased by providing it with a textile envelop or sheath $o$, according to the common practice in the art, and I have shown such an envelop in most of the forms illustrated in the drawings.

Any suitable method of securing the tire to the rim of the wheel may be employed. In Figs. 1 and 2 I have shown a recessed plate $i$, interlocking with lips or extensions $a'$, a bolt $h$ serving to draw the plate tightly against the rim $j$, so as to firmly clamp the lips or extensions $a'$ between the plate and the rim of the wheel in such a manner as to prevent its becoming detached. In Fig. 4 I have shown a somewhat different form in which the nut of a bolt is embedded in the base portion of the tire, as shown at $l$ in said figure, while the bolt itself is passed through the rim and tapped into said nut.

In Figs. 5 and 6 I have shown a form of tire which is made up of a series of contiguous blocks $p$, each block containing the oblique perforations with the intermediate elastic connecting walls or webs. I have also shown a convenient mode of fastening these blocks to the rim of the wheel. As shown, the rim is provided on each face with a projecting plate $q$, which form, in conjunction with the rim, a sort of channel in which the tire is seated.

The blocks $p$ are secured to strips of canvas $r$, the strips being somewhat longer than the blocks themselves, so that they overlap at their adjacent ends. Through these overlapping ends is passed a screw or bolt $s$, which serves to bind the strip firmly to the rim of the wheel.

The orifices or chambers shown in the various forms illustrated in the drawings are circular in cross-section; but it will of course be understood that I do not confine myself to such a shape of orifice.

A careful examination of the various forms of tire herein shown and described will make it clear that the compression of the tire at any point must exert a pull or tension upon the connecting-webs which connect the depressed portion with the portions of the tire immediately surrounding it, and that consequently such depression must result in stretching said webs to a greater or less extent, according to the amount of compression.

It will be clear that the action referred to is quite different from the action which takes place when the rubber tube is compressed laterally, for in the latter case the compression of the tube takes place without any substantial or appreciable stretch of the rubber itself, the action being to all intents and purposes the same as if the tube were made of leather or some other non-distensible fabric. This difference is a very radical one, for where, as in the case with my invention, the resistance to compression and the tendency to return to the original shape after the pressure has been removed is due to the inherent elastic properties of the rubber itself the fabric will retain its elasticity so long as the rubber itself remains elastic, while on the other hand where this property of the rubber is not utilized in this way the fabric will become quickly broken down under repeated or long-continued pressure and will not resume its original shape. It is to be understood, therefore, that the gist or basic feature of my invention is a cellular fabric in which the intermediate walls or webs are stretched when the fabric is compressed, whereby when the pressure is removed the retractile force of the stretched rubber restores the fabric to its normal shape.

Without attempting to set forth all the changes in form and construction that may be made in the practice of my invention or without attempting to indicate all the modes of its use, what I claim is—

1. A vehicle-tire provided with a strip of elastic vulcanized rubber formed with a series of orifices or chambers extending obliquely from the inner face toward the outer face or tread of the tire, said orifices being staggered with reference to each other so that the walls of one row of orifices may be in vertical alinement with the orifices of the next row to allow the complete collapsing of the fabric.

2. A rubber tire provided with a series of orifices extending at an angle to the longitudinal axis of the tire, each orifice being surrounded by an elastic web which forms the wall of the orifice and separates it from the adjacent orifices and a sheath or envelop of canvas or the like inclosing the rubber containing the perforations, substantially as described.

3. A vehicle-tire consisting of rubber molded and vulcanized so as to form a series of tubular orifices or chambers extending obliquely from the base of the tire to its tread, each orifice being surrounded by an elastic web which is stretched when the tire is compressed substantially as described.

4. A vehicle-tire comprising an air-tight envelop or tube containing next its outer face or tread a strip of rubber having a series of independent inclosed orifices extending at an angle to the longitudinal axis of the tire, and separated from each other by distensible webs or walls the inner or base portion of said tube being left vacant to form an annular air-chamber substantially as described.

In witness whereof I have hereunto set my hand this 21st day of August, 1900.

MICHAEL A. KENNEDY.

In presence of—
GEO. N. GODDARD,
JOHN R. KENNEDY.